United States Patent [19]
Flint et al.

[11] Patent Number: 6,141,634
[45] Date of Patent: Oct. 31, 2000

[54] AC POWER LINE NETWORK SIMULATOR

[75] Inventors: Ephraim Bemis Flint, Garrison, N.Y.; Brian Paul Gaucher, New Milford, Conn.; Young Hoon Kwark, Chappaqua; Duixian Liu, Ossining, both of N.Y.

[73] Assignee: International Business Machines Corporation, Armonk, N.Y.

[21] Appl. No.: 08/979,126

[22] Filed: Nov. 26, 1997

[51] Int. Cl.[7] .............................. G06F 17/50; G06G 7/54
[52] U.S. Cl. ............................ 703/18; 703/20; 700/291; 700/292; 700/293; 700/294; 340/310.01
[58] Field of Search ........................ 395/500.34, 500.39, 395/500.41; 340/310.01–310.08; 364/528.26, 528.27, 528.28, 528.29; 703/13, 18, 20; 700/291, 292, 293, 294

[56] References Cited

U.S. PATENT DOCUMENTS

| | | | |
|---|---|---|---|
| 4,417,207 | 11/1983 | Sato | 324/603 |
| 5,684,450 | 11/1997 | Brown | 340/310.02 |
| 5,933,073 | 8/1999 | Sheuy | 340/310.07 |

OTHER PUBLICATIONS

Corcoran et al, "A Remote Electronic Emulation System for Home Bus Applications", IEEE Transactions on Consumer Electronics, pp. 405–410, Aug. 1994.

Kelly et al, "A Residential Energy Management Test Using CEbus", IEEE Transactions on Consumer Electronics, pp. 921–926, Nov. 1992.

*Primary Examiner*—Kevin J. Teska
*Assistant Examiner*—Samuel Broda
*Attorney, Agent, or Firm*—F. Chau & Associates, LLP

[57] ABSTRACT

In an illustrative embodiment, the AC power line network simulator includes an enclosure for containing elements of the system. An AC coupling network coupled to the network simulator implements the functions relating to a particular simulation. A distribution panel connected to a power feed distributes power and includes outgoing circuits and circuit breakers for protecting the outgoing circuits. A plurality of outlets are connected to the breakers of the panel. Through the use of the simulator, with the AC coupling network, simulation of an AC power line network, such as measuring electrical signals, recording electrical signals, simulating electrical signals and inserting electrical signals, can be easily performed. The measured, recorded, simulated and inserted signals correspond to electrical characteristics of elements found in an AC power line network, and can be stored for later analysis. In addition, once simulation information has been stored, it can be reproduced as desired.

16 Claims, 6 Drawing Sheets

AC POWER LINE NETWORK SIMULATOR

BACKGROUND OF THE INVENTION

1. Field of the Invention

This invention relates to network simulators. More specifically, it relates to an AC power line network simulator for testing AC power line network communication systems.

2. Description of the Prior Art

AC power line network communication systems have been around for a number of years, and in the past consisted of such things as the X-10 Controller from Radio Shack. The X-10 was a reasonably low cost, low performance system which allowed homeowners to turn lights on and off, and to network security systems to main controllers and the phone system.

There has not been much development in the area until recently, with the current use of what is known as consumer electronics bus (CEBus) and the impending use of Spread spectrum AC Power Line Communication systems. The development of these systems is plagued with problems. For example, the AC wiring in every home is unique. Thus, what may work in one home may not work in another. An additional problem is the lack of a consistent technique for testing these systems in a simulated, predictable and repeatable environment. If a system does not work in a particular home, it is virtually impossible to determine the cause and to recreate that condition in a laboratory environment. There is also no way to measure particular disturbances in a home and input that information into a controlled laboratory setup.

The present invention solves many of the shortcomings described above by providing a virtual home that can be reconfigured to suit a variety of test conditions, yet is confined within a single rack and could be made even smaller.

SUMMARY OF THE INVENTION

In an illustrative embodiment, the AC power line network simulator includes an enclosure for containing elements of the system. An AC coupling network coupled to said simulator implements functions pertaining to simulation. A distribution panel connected to a power feed distributes power within the simulator. The panel has outgoing circuits and circuit breakers for protecting the outgoing circuits. A plurality of outlets and means for connecting the plurality of outlets to the breakers of the panel are provided. Additionally, functions corresponding to simulation of an AC power line network can be implemented through the AC coupling network such as measuring electrical signals, recording electrical signals, simulating electrical signals and inserting electrical signals. The measured, recorded, simulated and inserted signals correspond to electrical characteristics of elements found in an AC power line network.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF PREFERRED EMBODIMENTS

Figure 1:
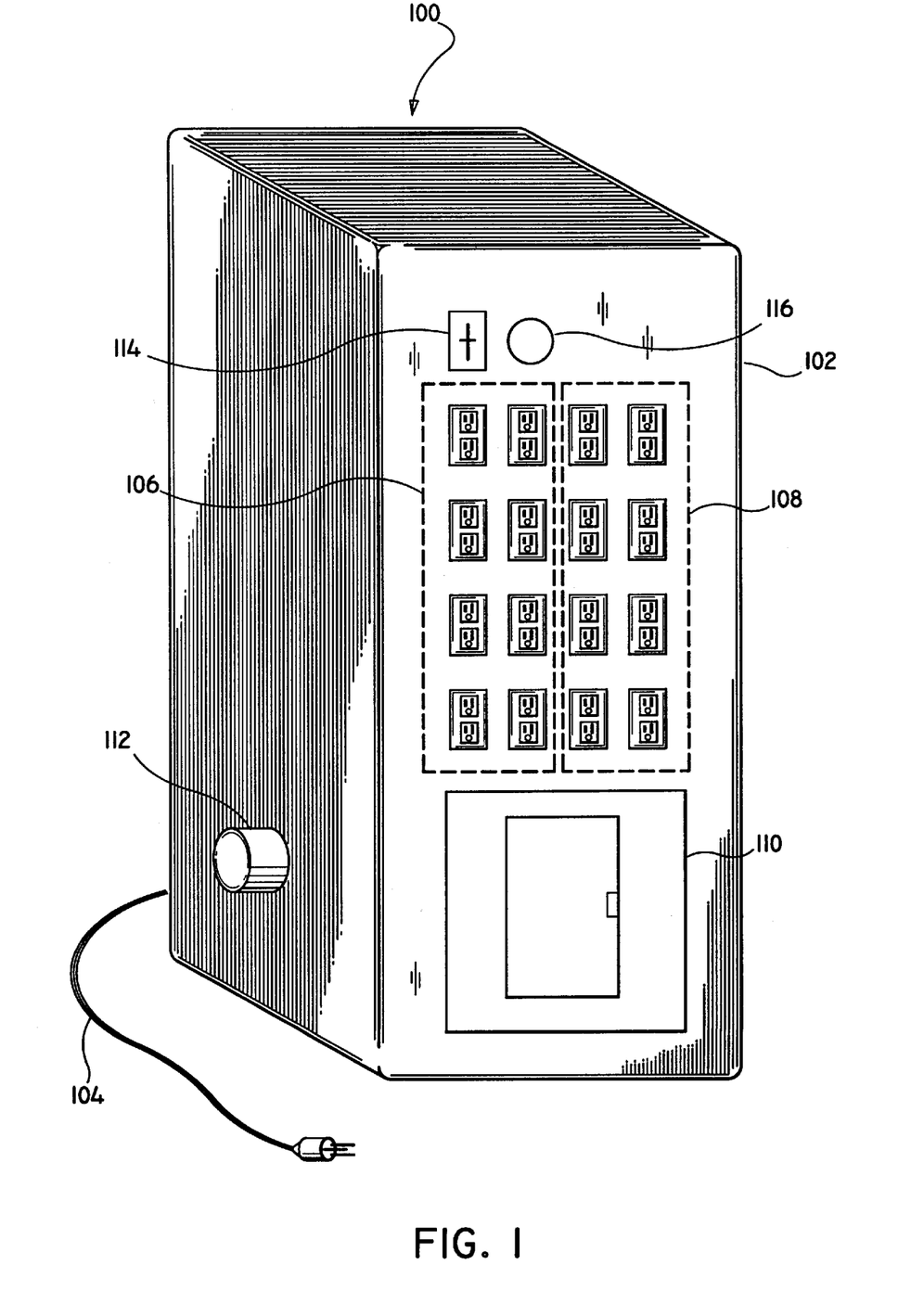
FIG. 1 illustrates an isometric view of an AC power line network simulator according to an embodiment of the invention.

Referring to FIG. 1, an AC power line network simulator 100 according to an illustrative embodiment of the invention is shown. The simulator 100 includes a rack 102 for containing electric components. Power is supplied to rack 102 through feed 104. A plurality of 110 V outlets 106 and 220 V outlets 108 such as those found in a conventional home are contained in rack 102. A service panel (i.e., distribution/junction panel or breaker box) 110 configured for typical home usage is provided, equipped with a main breaker and circuit breakers. The main breaker may be, for example, a 100, 150 or 200 Amp breaker, and the circuit breakers may be, for example, ground fault interrupt, double breakers, 5, 10, 15, 20, and 30 amp circuit breakers. An optional meter 112, such as the induction-type watt-hour meters found on the outside of U.S. homes, can be connected between feed 104 and service panel 110. There is a dimmer switch 114 which is one of the elements considered to cause the most noise on household AC power networks. A light 116 is associated with dimmer switch 114. Means for connecting the outlets (e.g., wire, cable) is not shown in FIG. 1. An AC coupling network 118 (not shown) is provided to insert and/or measure what is going on in the wiring at any particular outlet.

Figure 2A:
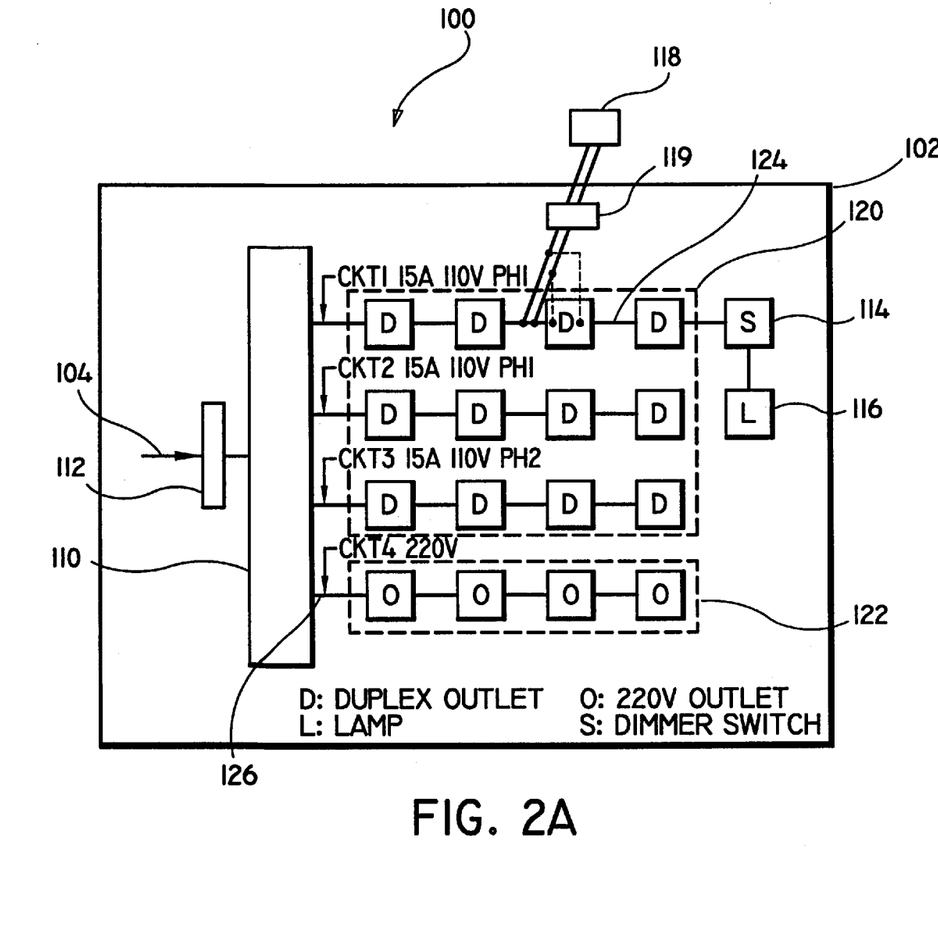
FIG. 2a is a block diagram representation of the circuitry layout of the simulator of FIG. 1.
Figure 2B:
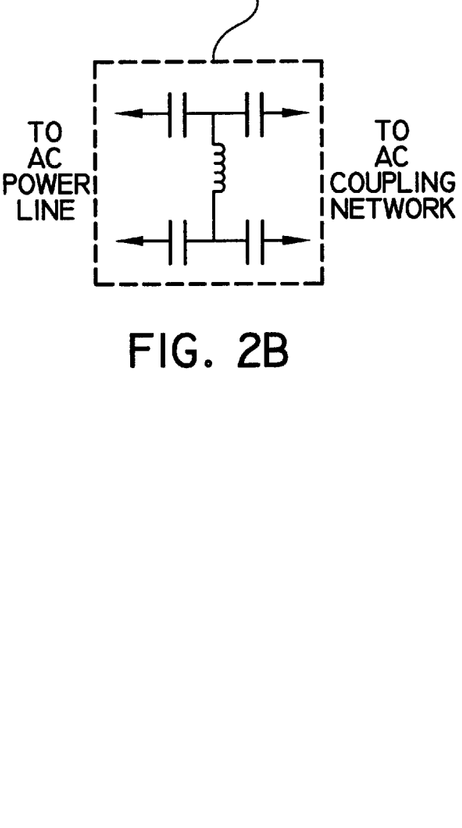
FIG. 2b is a schematic representation of a high pass filter according to an embodiment of the present invention.

FIG. 2a shows the circuitry layout of simulator 100 according to the illustrative embodiment of FIG. 1. The exemplary rack 102 is a standard 22 by 22 by 84 inch rack, although the rack dimensions may be varied as desired. Single phase 110/220V AC power enters rack 102 through a 10/4 three conductor feed 104. The optional meter 112 is connected between feed 104 and service panel 110. The service panel 110 supplies circuits like those found in a typical home. The embodiment of the invention illustrated in FIG. 2 provides: two 110V, 0 degree (phase 1) circuits designated circuit 1 and circuit 2; one 110V, 180 degree (phase 2) circuit designated circuit 3; and one 220V designated circuit 4. Circuit 1 and circuit 2 are used for same phase power line communications (PLC) study. In such a case, the transmitter and the receiver are on the same 110V power line. Circuit 3 is used for opposite-phase PLC study, in which the transmitter is on circuit 1 or 2 while the receiver is on circuit 3, or vice versa. Two hundred and twenty volt power is needed for appliances such as clothes dryer and ranges. Thus, circuit 4 is used to study the effects of 220V appliances on PLC. The types and number of circuits can be varied as desired. The AC coupling network 118 is connected to monitor selected elements of the simulator through a high pass filter 119, as shown in FIG. 2b, which removes unwanted power line harmonics as well as the dangerous high voltage.

Four duplex outlets are used for each circuit in this example. Duplex outlets 120 rated for 110V are used for the 110V circuits, and duplex outlets 122 rated for 220V are used for the 220V circuits. The outlets are connected to each other using Romex cable 124 (5, 10 and 20 feet long) wound in a way to reduce the mutual coupling between adjacent outlets. However, metal jacketed cable (e.g., BX cable) could also be used to connect the outlets to each other in an effort to further reduce coupling. It is to be appreciated that the length of the cables between the outlets can be adjusted very easily by substituting different cable lengths. A dimmer switch 114 controlling light 116 is connected to circuit 1. Dimmer switches are a significant contributor of power line noise.

Metal jacketed cable 126, typically three feet long, is used for connecting the first outlet of each circuit to the panel. The metal-jacket helps to isolate one outlet from radiating to another locally connected outlet. The wiring features of a whole house have been incorporated into this single, relatively small rack for the purpose of testing how well a particular AC power line communication system works which includes evaluating how well the system can bridge across one breaker to another. Thus, it is important to shield the closely mounted outlets from each other to ensure the signals cross at the breaker, rather than by radiating RF energy from the coils of wire in the back of the rack.

The rack 102 provides a convenient entry point to allow the introduction of impairments. For instance, it might be determined that the refrigerator is a significant source of noise in a home and the reason that the AC power line communication system is not working properly. In this case, we can record the electrical characteristic of the refrigerator in the home using AC coupling network 118 and a digital storage oscilloscope (DSO) with memory. The AC coupling network 118 is a relatively high frequency filter allowing only those frequencies through that are well above the power line frequencies. In the U.S., the cut off could be as low as the fifth harmonic or 300 Hz (5×60 Hz). Thus, only those frequency components above 300 Hz would pass through. In most cases, however, it is beneficial to set the cutoff frequency higher, for example, to about 1 MHz, in order to reduce interference from elements such as fluorescent lights, dimmers, and switching power supplies. This electrical signature can then be brought to the laboratory environment and played back into simulator 100 through a similar coupling block.

The DSO records the time varying signature of the noise or impairment. Depending upon the application, it can either record the impairment in a single vector recording, or an I and Q (In-Phase and Quadrature) recording. The I and Q representation allows a more detailed study that includes both magnitude and phase. In either case, the signals can then be brought back to the lab, scaled appropriately and re-inserted into simulator 100. The local disturbance or impairment can now be studied in isolation. The AC power line communication system can be plugged directly into simulator 100 just as it might be in a home. The monitor points of simulator 100 can be outlets 106, 108, service panel 110 or the cables 124, 126. Thus, simulator 100 provides a greater degree of access not possible in many homes.

The lengths of cabling 124, 126 can be varied from the back of rack 102. Breaker size and location is adjustable and meter 112 may or may not be used. A utility meter that normally resides on the outside of a home is thought to act as a small filter, due to its inductive nature, and somewhat impede the leakage of the signal into a neighbor's home. In most cases, leaking a signal to a neighboring home is undesirable since security issues could quickly become a limiting factor. Also, the Federal Communications Commission (FCC) has strict regulations on what may or may not be put onto a power line or phone line and how much radiation is allowed in specific frequency bands.

In addition to the functions just described, another embodiment of simulator 100 allows the ability to measure and add signals from a high speed Digital Signal Processor (DSP). By using AC coupling network 118 and recording signals, a library of impairing signals can be made. For example, in a typical home, impairing signals could result from anything with an electric motor, such as washing machines, dryers, saws, drills, furnaces, water heaters, etc. These signals would be stored in memory and subsequently recalled by the user for playback into the simulator 100, either individually or in concert (i.e., by adding a number of these together possibly in complex signal (I and Q) form).

A high speed DSP, such as the TI TMS 320 6X, is required since the frequencies of interest are in the 15 to 40 MHz range. This range would call for sampling by at least a factor of two in order to satisfy the Nyquist rate, but a factor of three is preferable. Three times 40 MHz pushes us to 120 MHz which is almost beyond what is currently available. Utilizing the high speed DSP and sufficient memory allows simulator 100 to both record and introduce impairments in a combination. This provides an incredibly powerful combination for both characterizing high speed AC power line communication systems and testing or evaluating competing systems.

One of the toughest challenges facing communications over AC power lines is the variations in transmission characteristics and noise environments from one installation to another. In many respects, the frequency dispersive nature, multipath, and strong jammers of AC power line communications systems are reminiscent of indoor RF propagation. Thus, as for RF systems, the designer of AC power line communication systems needs to have the capability of simulating the salient features of the AC power line in a laboratory. Several approaches are possible. One such approach is a physical power line emulator, consisting of actual components found in an AC network such as circuit breakers, outlet boxes, distribution panels, and transformers, connected by varying lengths of wiring, which resembles the physical connectivity in a typical home or office. This approach allows testing under energized conditions with actual appliances acting as loads and noise sources. However, the locations of wiring and appliances in a home typically cover a large area of physical space and thus such an approach offers limited flexibility, and may not give an accurate broadband emulation of the parasitic coupling found in house wiring because of the space required for an accurate simulation. Another drawback of this approach is the difficulty in physically repeating a given configuration due to inevitable changes in variables such as appliance behavior due to, for example, loading, brush wear, etc.

It is to be appreciated that a method for capturing, analyzing and playing back a "recording" of the noise found on an AC power line network would be extremely valuable. Such capabilities would further augment the features of the simulator described above.

The present invention described herein, offers a complementary approach that takes many field measurements of representative AC power line networks, extracts the key signaling related features, then stores these in a "library". These characteristics can then be replayed either alone or in various combinations to yield more of a "statistical" evaluation of the communication link performance. This playback can be in one of two modes. In the first mode, this information is used in a purely software simulation environment. This provides the most flexible approach for initial sizings and development of the modulation schemes and protocols. In the second mode, which is adopted during hardware development, the signal path degradation can be emulated in its key features with a hardware emulator. This allows some measure of real time feedback to aid hardware development, although the additional latency may preclude simple extraction of characteristics such as, for example, throughput statistics.

Figure 3A:
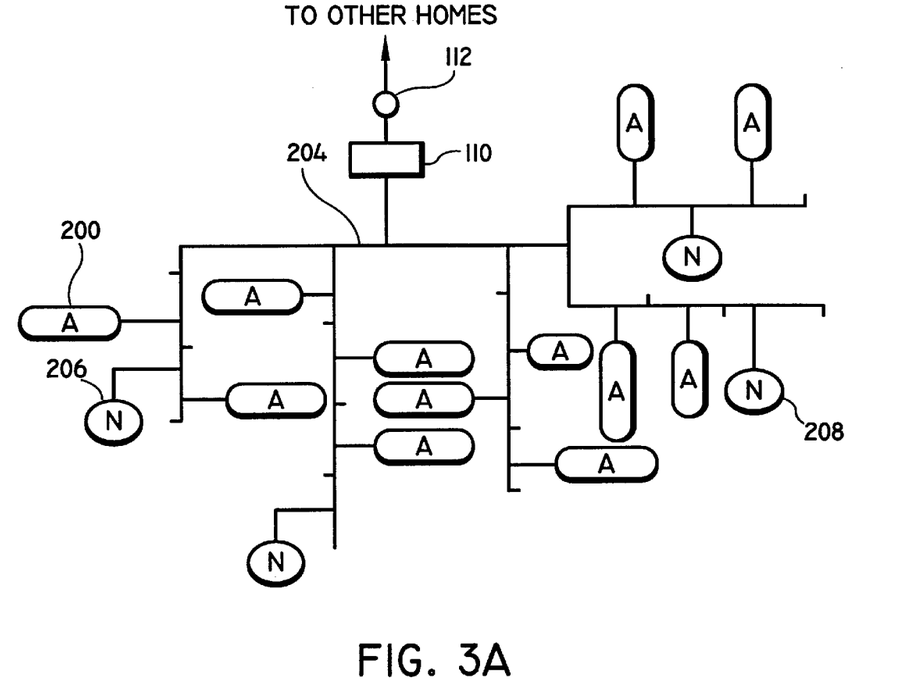
FIG. 3a is a schematic representation of an AC power line communications system.
Figure 3B:
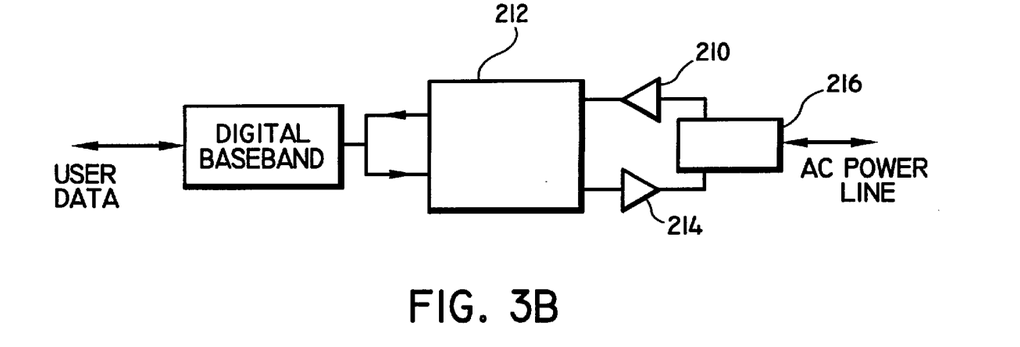
FIG. 3b is a schematic representation of an AC line communication node.

The topology of the simulator 100 of the present invention is now explained with reference to FIGS. 3a and 3b, which show a schematic representation of an AC power line communications system and an exemplary AC communications node, respectively. Appliances 200 and AC line communication nodes or units are shown connected to an AC power line grid 204. For the time-division multiple access (TDMA) systems considered here, at any given time, one unit or node is designated as the transmitter 206 while all other units are receivers 208. Each communications unit consists of a signal chain which includes a receiver front end 210, a modem 212 to convert the analog signal conveyed on the power line to digital information and vice versa, a digital baseband processor to convert the digital information into a format required by a user interface, a power driver module 214 and a line coupling module 216. The signal transmitted by the talking unit 206 is degraded by several mechanisms. The first is impedance mismatch between the line coupling module 216 and the AC power line. The second is intrinsic loss in the AC power line, which is a lossy and leaky transmission line. The presence of numerous unterminated branches adds many echoes to the signal. Finally, noise from various sources also corrupts the signal.

According to an embodiment of the invention, the simulator 100 and accompanying hardware, as described earlier with reference to FIGS. 3a and 3b, are utilized as a unidirectional signal processing element that accepts the transmitter's signal as an input, distorts the signal with the above impairments and injects the corrupted signal into the receiver signal chain. This bypasses the line coupling elements 216 since the impedance mismatch distortion is difficult to physically emulate, and since it is already included in the measurements outlined below. If a full duplex simulation is desired, then two such signal processors will be needed, each servicing one direction of signal flow.

Figure 4:
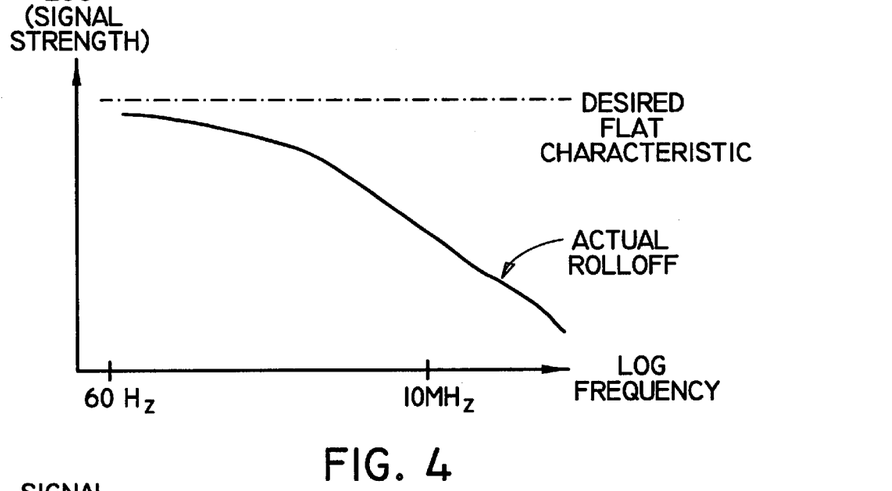
FIG. 4 is a graph representing the frequency dispersive loss in AC power lines.

A characterization of AC power line networks is hereinafter described. The AC power line acts essentially as a "pseudo" balanced transmission line, unbalanced by the ohmic connection of the ground safety wire to one of the two power carrying conductors. Since this type of cable (e.g., Romex cable) is not intended as a high frequency signaling cable, it suffers from significant frequency dispersion when signaling frequencies are in the tens of MHz. FIG. 4 illustrates an example of the frequency dispersive loss in AC power lines. This dispersion can lead to severe pulse distortion and intersymbol interference.

Figure 5A:
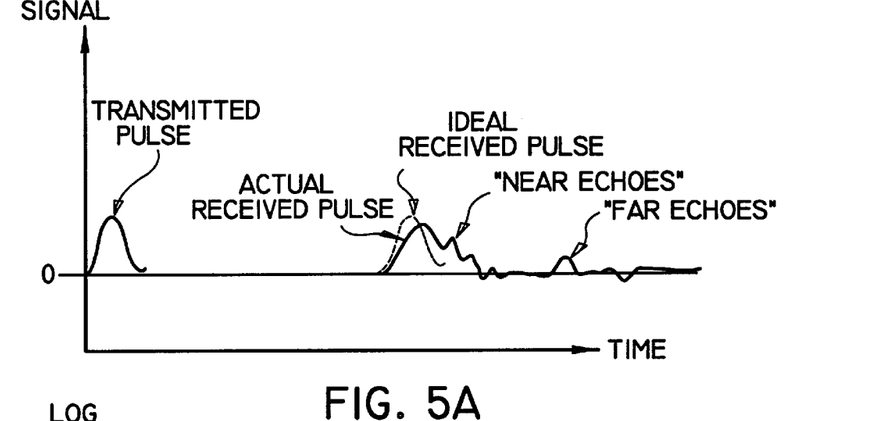
FIG. 5a is a graph in the time domain illustrating multipath echoes in AC power line networks.
Figure 5B:
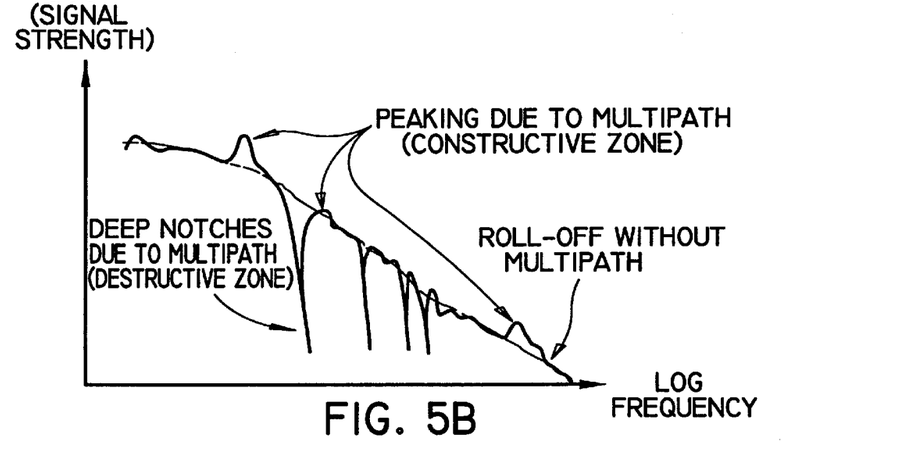
FIG. 5b is a graph illustrating the affects of multipath with respect to communication signal frequency response in AC power line networks.

A far more severe effect on AC power line communications is produced by the fact that the power line topology is not a single "bus," but tends to resemble a star network with fractal branches. The terminals are represented by the appliances that are wired into the network, most often by inserting a power cord associated with an appliance. Since the "topology" of this network is ad-hoc, and since the impedance presented by the appliances is rarely "matched" to that of the ROMEX itself, the result is that many echoes and reverberations are produced by each of these impedance discontinuities as "communication" pulses are sent down the AC power line. This phenomenon is often referred to as "multipath". The effect of multipath in the time domain is shown in FIG. 5a and can be seen as satellite echoes (designated "near echoes" and "far echoes") which may interfere with the original transmitted pulse or with subsequent pulses. FIG. 5b shows the effect of multipath in the frequency domain, where multipath appears as a multiplicity of constructive and destructive zones. The latter are manifested as deep notches with very high Q. These are very difficult to emulate over a wide bandwidth with lumped analog components, but are readily implemented with digital filters.

In addition to frequency dispersion and multipath, non-linear effects may occur on the power line. Many appliance loads involve magnetic components whose cores often approach saturation, thus producing a non-linear load which can result in the unwanted mixing of frequency components. In addition to non-linear loading, noise sources are plentiful on the AC power line including, for example, white, colored, gaussian and impulsive noise. Most of these can be adequately represented by their small signal spectra. However, for some types of noise, such as impulse noise, noise generated by power equipment, or even simple brush noise from commutated motors, the noise amplitudes are likely to exceed the dynamic range of feasible signal amplifiers and require special design.

Figure 6A:
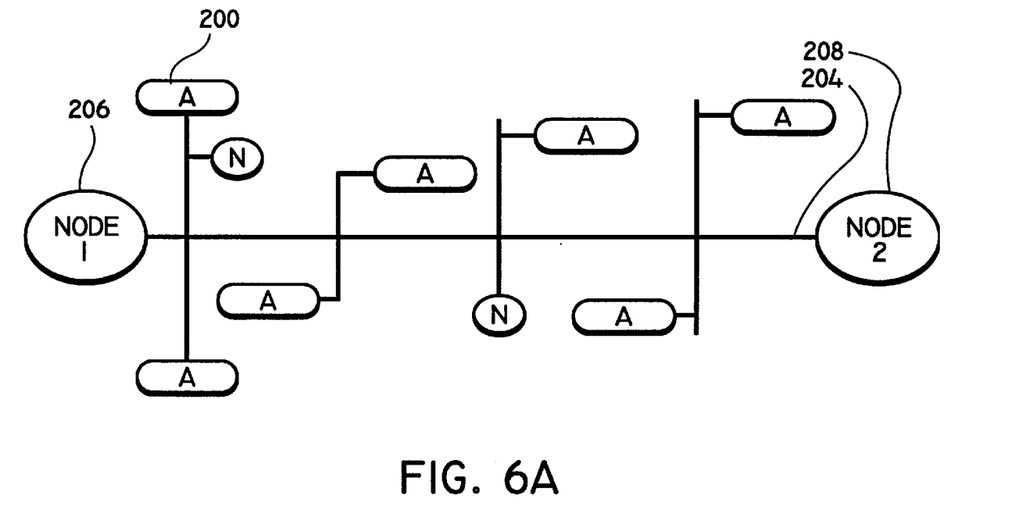
FIG. 6a is a schematic representation of an AC power line communication system coupled to an AC power line network.
Figure 6B:
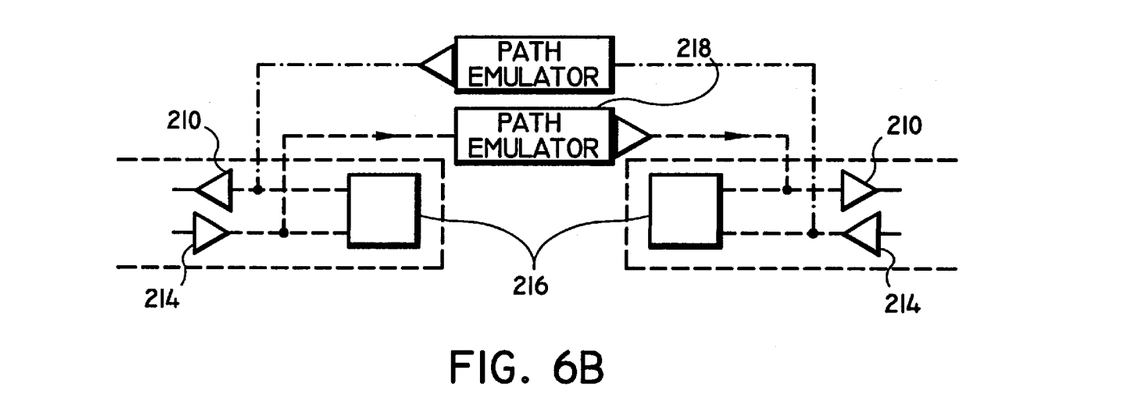
FIG. 6b is a schematic representation of an AC power line communication system coupled to a AC power line network emulator.

The present invention limits the characterization to linear sources only, to assume that non-linear mixing processes are of second order in disruption of the communications link, and to treat noise sources as small signals except for impulse type noise which will be simply replaced with a signal of sufficient amplitude to saturate the signal chain. Thus, based on these simplifications, a schematic representation of an AC power line communication system coupled to a AC power line network emulator according to an embodiment of the invention is shown in FIG. 6b. In contrast, a schematic representation of an AC power line communication system coupled to an AC power line network shown is shown in FIG. 6a. FIG. 6b shows the power line grid 204 of FIG. 6a replaced by path emulators 218 (which bypass the line coupling modules 216 of the AC line communication nodes).

This signal processing is most readily done in virtual time "off-line" with software emulation. However, this approach may introduce too much latency to permit real time evaluations of link behavior. The hardware implementation using present DSP chips is still too slow to realize complex transfer functions with fine structure in real time. Real-time architectures are capable of processing samples as they are received from the signal source, as opposed to storing them in buffers for later processing.

Figure 7:
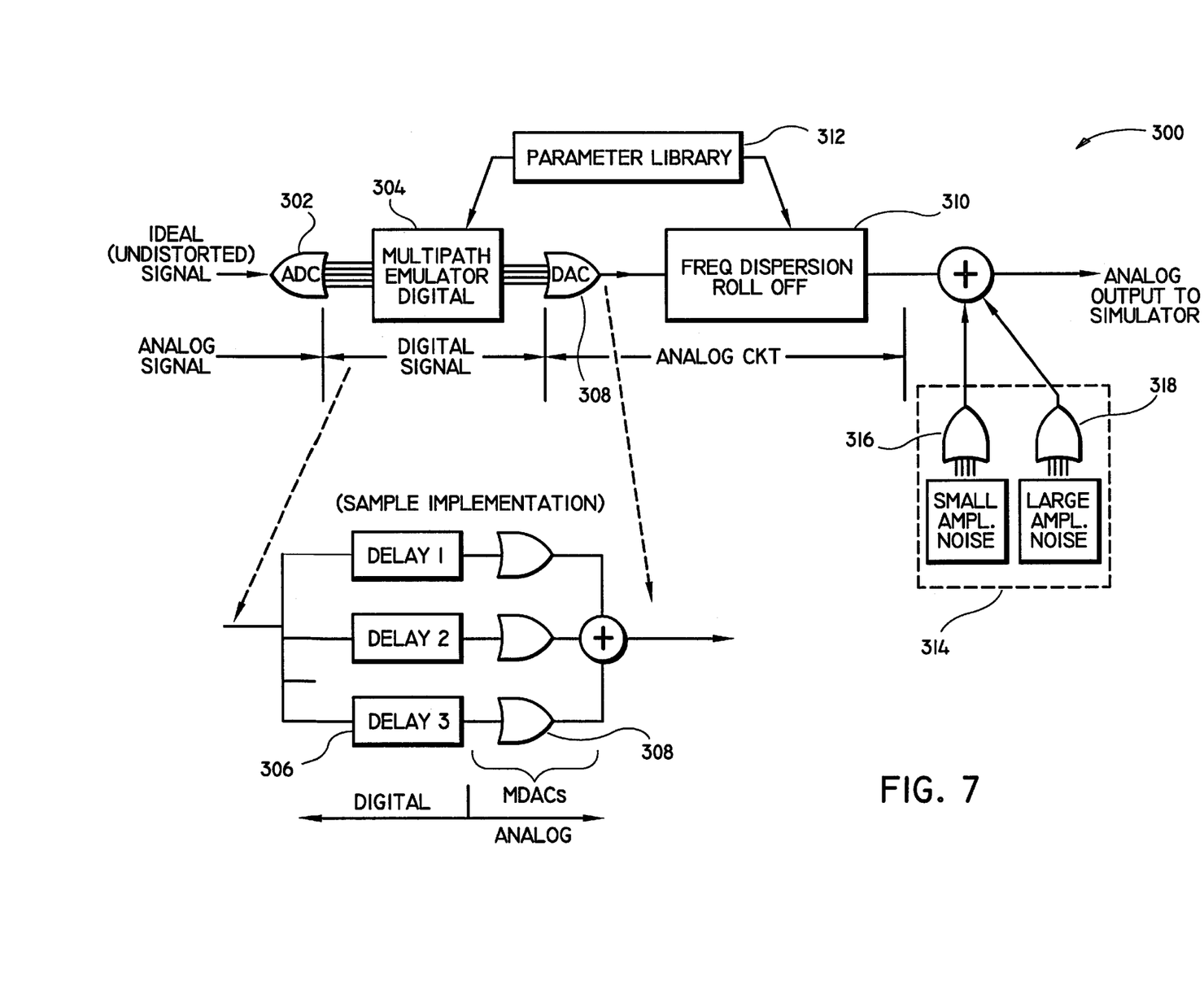
FIG. 7 is a schematic representation of a composite analog/digital AC power line signal emulator according to an embodiment of the invention.

A composite hardware implementation that does not rely on general purpose DSPs is shown in FIG. 7, which is a schematic representation of a composite analog/digital AC power line signal emulator (processor) 300 according to an embodiment of the invention. An ideal (undistorted) signal is digitized by an Analog-to-Digital converter (ADC) 302 at faster than Nyquist rate. This digitized waveform can then be fed into either a single or a bank of programmable digital filters 304 that will emulate the multipath characteristic. Since these filters 304 are being utilized to emulate the multipath delays, their structure may be simpler than that of a general purpose filter. In principle, the filters 304 could be simple digital shift registers 306 whose outputs are then fed to a multiplying digital to analog converter 308 which performs the scaling function (including inversion if desired). A frequency dispersion roll-off block 310 uses lumped analog circuits with programmable filter parameters to emulate the intrinsic roll-off of the lossy AC power line. A parameter library 312 provides programmable digital filters 304 and frequency dispersion roll-off block 310 with the numerical coefficients needed to emulate a particular power grid. Those coefficients represent a "best" fit to the experimental data for a particular measurement.

Following these blocks is a digital noise library or noise injector block 314 composed of two Digital-to-Analog Converters (DACs) 316, 318. The first DAC 316 emulates low signal amplitude, high bandwidth noise signatures, so it can be a fast, but limited precision converter. The first DAC 316 is augmented by the second DAC 318, a more precise but slower converter which is used only to emulate large signal impulse type noise sufficient to overload the front-end circuits of the receiver in order to test overload recovery characteristics. The analog output of the composite signal emulator is then fed into simulator 100.

This composite structure is necessitated by the limitations of currently available cost-effective hardware. As technology advances, these may be consolidated into fewer blocks with the ultimate goal of a real time DSP emulation capability.

The utility of the emulation approach is that once the infrastructure is in place, it becomes possible to simulate the operation of the AC communications link in various scenarios. However, this requires that a large number of actual AC power line configurations be measured. This is best approached heuristically, but is open to the possibility that some particularly onerous combination of parameters will be encountered during the sampling. This exposure is present with either the physical emulator or the signal emulator approach. The latter offers more flexibility as additional field experience can be readily incorporated into the libraries. As an example, competing AC power line communications systems can be folded into the library of "noise" sources 314 (FIG. 7).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An AC power line network simulator, comprising:
   an enclosure for containing elements of said simulator in a user defined and adjustable configuration;
   an AC coupling network disposed within said enclosure for providing a pathway for signals at least one of to and from any of the elements of said simulator;
   an AC power line network, the network comprising:
      a distribution panel for distributing power and having outgoing circuits and circuit breakers for protecting said outgoing circuits, said panel receiving power from a power feed;
      a plurality of outlets connected to said circuit breakers; and
      means for connecting said plurality of outlets to said circuit breakers; and
   means for infecting composite signals into said simulator, the composite signals comprising multipath and roll-off characteristics of an AC power line, whereby an element to be tested is coupled to said simulator for testing under energized conditions.

2. The simulator of claim 1, wherein said means for injecting comprises:
   means for digitizing an analog power line signal;
   first adding means for adding a digital signal emulating a multipath characteristic of an AC power line to the digitized signal to form a digital composite signal;
   means for converting the digital composite signal to a first analog composite signal;
   second adding means for adding an analog signal emulating a roll-off characteristic of the AC power line to the analog composite signal to form a second analog composite signal; and
   means for injecting noise onto the second analog composite signal to form a third analog composite signal for injecting into said simulator.

3. The apparatus of claim 2, wherein said means for digitizing is an analog-to-digital converter.

4. The apparatus of claim 2, wherein said injecting means comprises:
   a first digital-to-analog converter for emulating low signal amplitude, high bandwidth noise signatures;
   a second digital-to-analog converter for emulating large signal impulse-type noise; and
   a summing circuit for summing the output of said first digital-to-analog converter, the output of said second digital-to-analog converter and the second analog composite signal.

5. The apparatus of claim 1, wherein said plurality of outlets further comprises at least one outlet for each of said outgoing circuits.

6. The apparatus of claim 1, wherein said means for connecting said plurality of outlets is selected from the group consisting of metal-jacketed cable and Romex cable.

7. The apparatus of claim 1, further comprising at least one light source connected to one of said breakers.

8. The apparatus of claim 7, further comprising at least one dimmer switch for controlling said light, said dimmer switch being connected to one of said breakers.

9. The apparatus of claim 1, further comprising a meter for measuring the power supplied by the power feed, said meter being connected between the power feed and said panel.

10. The apparatus of claim 1, wherein said AC coupling network is utilized for functions selected from the group consisting of measuring electrical signals, recording electrical signals, simulating electrical signals and inserting electrical signals into the simulator.

11. The apparatus of claim 1, further comprising measuring means coupled to said AC coupling network for measuring electrical characteristics of the elements of said simulator.

12. The apparatus of claim 1, further comprising recording means coupled to said AC coupling network for recording electrical characteristics of the elements of said simulator.

13. The apparatus of claim 1, wherein said AC coupling network further comprises a digital signal processor for inserting signals in an AC power line communications system.

14. The apparatus of claim 1, further comprising a high pass filter, said high pass filter connected between said AC coupling network and an AC power line.

15. The AC power line network simulator of claim 1, further comprising an AC power line communication system coupled to said simulator for testing communication integrity of said communication system.

16. A method for emulating AC power line signals in an AC power line network simulator, comprising:

digitizing an analog power line signal;

adding a digital signal emulating a multipath characteristic of an AC power line to the digitized signal to form a digital composite signal;

converting the digital composite signal to a first analog composite signal;

adding an analog signal emulating a roll-off characteristic of the AC power line to the analog composite signal to form a second analog composite signal; and injecting noise into the second analog composite signal to form a third analog composite signal for injecting into said simulator.

* * * * *